United States Patent
Genty et al.

(10) Patent No.: US 6,948,118 B2
(45) Date of Patent: Sep. 20, 2005

(54) APPARATUS AND METHOD OF BOOKMARKING PATHS TO WEB PAGES

(75) Inventors: Denise Marie Genty, Austin, TX (US); Gerald Francis McBrearty, Round Rock, TX (US); Johnny Meng-Han Shieh, Austin, TX (US); Shawn Patrick Mullen, Buda, TX (US); James Stanley Tesauro, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 677 days.

(21) Appl. No.: 09/974,970

(22) Filed: Oct. 11, 2001

(65) Prior Publication Data

US 2004/0205495 A1 Oct. 14, 2004

(51) Int. Cl.$^7$ ................................................. G06F 17/24
(52) U.S. Cl. ..................... 715/501.1; 709/219; 715/738
(58) Field of Search ....................... 709/219; 715/501.1, 715/512; 345/738, 822

(56) References Cited

U.S. PATENT DOCUMENTS

| | | | | |
|---|---|---|---|---|
| 6,184,886 B1 | * | 2/2001 | Bates et al. | 345/822 |
| 6,195,679 B1 | * | 2/2001 | Bauersfeld et al. | 345/738 |
| 6,334,145 B1 | * | 12/2001 | Adams et al. | 345/738 |
| 6,557,015 B1 | * | 4/2003 | Bates et al. | 715/501.1 |
| 6,658,402 B1 | * | 12/2003 | Dutta | 715/512 |
| 2002/0138486 A1 | * | 9/2002 | Rishel | 707/10 |

* cited by examiner

*Primary Examiner*—Heather R. Herndon
*Assistant Examiner*—Doug Hutton
(74) *Attorney, Agent, or Firm*—Volel Emile; Mark E. McBurney

(57) ABSTRACT

A method, system and apparatus for bookmarking a path to a presently displayed Web page are provided. The path is made of a plurality of web pages that have previously been accessed and from which the presently displayed Web page emanates. When a user wants to bookmark the presently displayed Web page, the user is given an option to choose all the Web pages that were previously accessed. If the user so chooses, all the Web pages are bookmarked at once. When the bookmark folder is accessed anytime thereafter, the bookmarked Web pages are displayed as a chain of bookmarked Web pages and in the order they were accessed.

28 Claims, 9 Drawing Sheets

APPARATUS AND METHOD OF BOOKMARKING PATHS TO WEB PAGES

BACKGROUND OF THE INVENTION

1. Technical Field

The present invention is directed to a method and apparatus for managing bookmark folders. More specifically, the present invention is directed to a method and apparatus for storing paths to bookmarks in a bookmark folder.

2. Description of Related Art

As is well known by now, the World Wide Web (WWW) or Internet is a system of servers that support documents formatted in Hyper Text Markup Language (HTML). HTML supports links to documents as well as to graphics, audio and video files. Links are references to documents from within other documents. Links allow a user to easily jump from one document or Web page to another with just a click of a mouse. Thus, a link is a very useful Internet navigational tool.

Another useful Internet navigational tool is a bookmark. A bookmark is a feature that is available in most Web browsers that allows a user to save addresses or URLs (abbreviation for Uniform Resource locators) of web pages into a folder (i.e., a bookmark folder) for later re-visitation. A web browser is a software application that is used to locate and display web pages. U.S. Pat. No. 6,037,944 issued to Himmel et al. and entitled NAMED BOOKMARK SETS as well as U.S. Pat. No. 6,208,995 B1 issued to the same inventors and entitled WEB BROWSER DOWNLOAD OF BOOKMARK SET describe how a bookmark is downloaded into a bookmark folder. The description in both patents is herein incorporated.

When a user accesses a Web page that may later be re-visited, the user may bookmark the page. There may be instances, however, when it may be convenient to bookmark not only a Web page but also a path that led to the Web page. For example, suppose that through links from a series of displayed Web pages, the user arrived at the Web page that will ultimately be bookmarked. Suppose further that while at the page to be bookmarked, it occurs to the user that the previously displayed pages, from which the page to be bookmarked emanated, contain information relevant enough to warrant a re-visitation at a later date. Then the user may want to bookmark these pages also.

Presently, when a user wants to bookmark a string of previously displayed Web pages from which a currently displayed page emanates, the user has to re-access every single one of these Web pages to bookmark them. Obviously, depending on the number in the string of previously displayed Web pages to be bookmarked, this can be a very time consuming endeavor.

Hence, what is needed is a method and apparatus that allow a user to bookmark a Web page including previously displayed Web pages from which it emanates.

SUMMARY OF THE INVENTION

The present invention provides a method, system and apparatus for bookmarking a path to a presently displayed Web page. The path is made of a plurality of web pages that have previously been accessed and from which the presently displayed Web page emanates. When a user wants to bookmark the presently displayed Web page, the user is given an option to choose all the Web pages that were previously accessed. If the user so chooses, all the Web pages are bookmarked at once. When the bookmark folder is accessed anytime thereafter, the bookmarked Web pages are displayed as a chain of bookmarked Web pages and in the order they were accessed.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
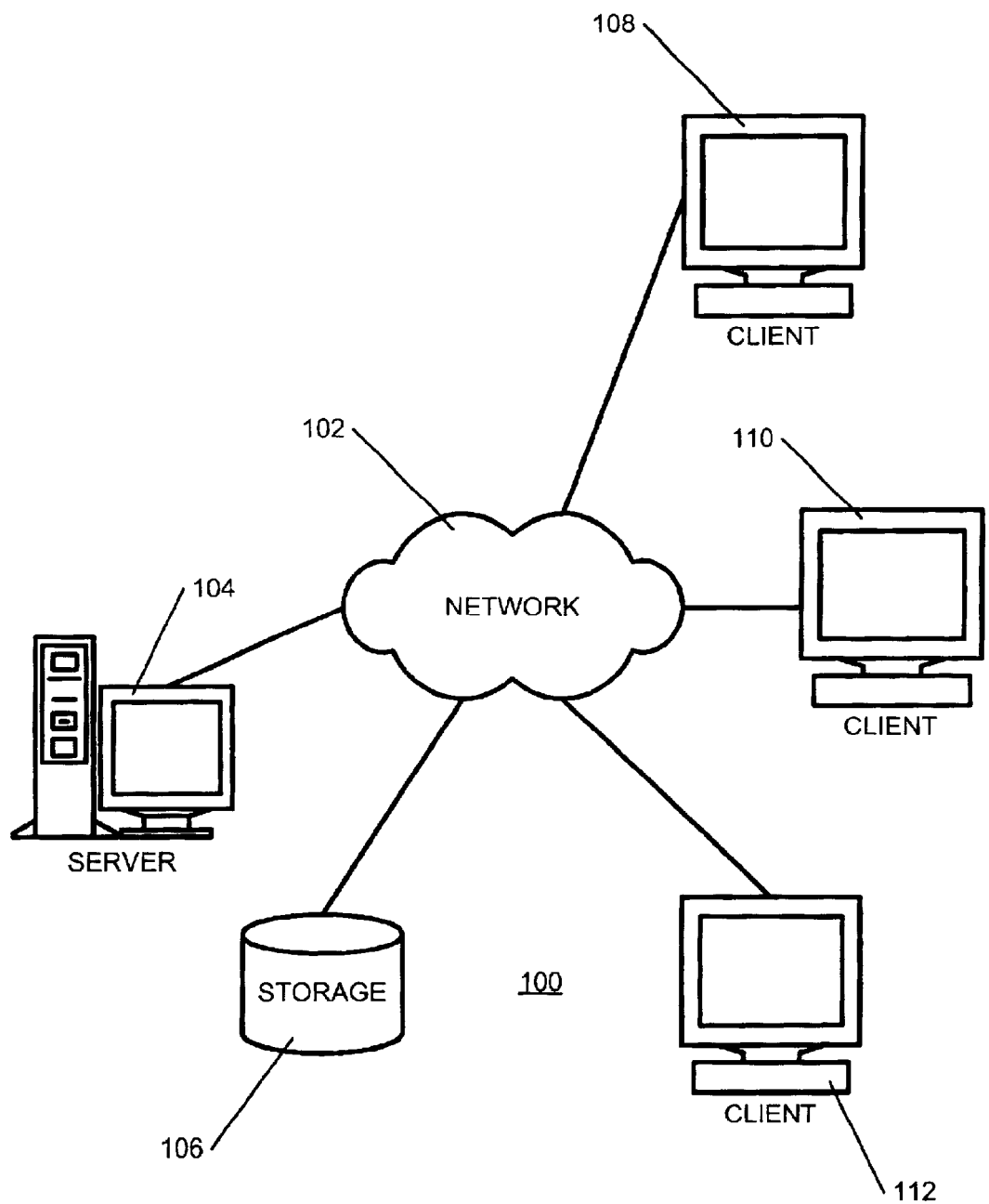
FIG. 1 is an exemplary block diagram illustrating a distributed data processing system according to the present invention.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108, 110 and 112. Clients 108, 110 and 112 are clients to server 104. Network data processing system 100 may include additional servers, clients, and other devices not shown. In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
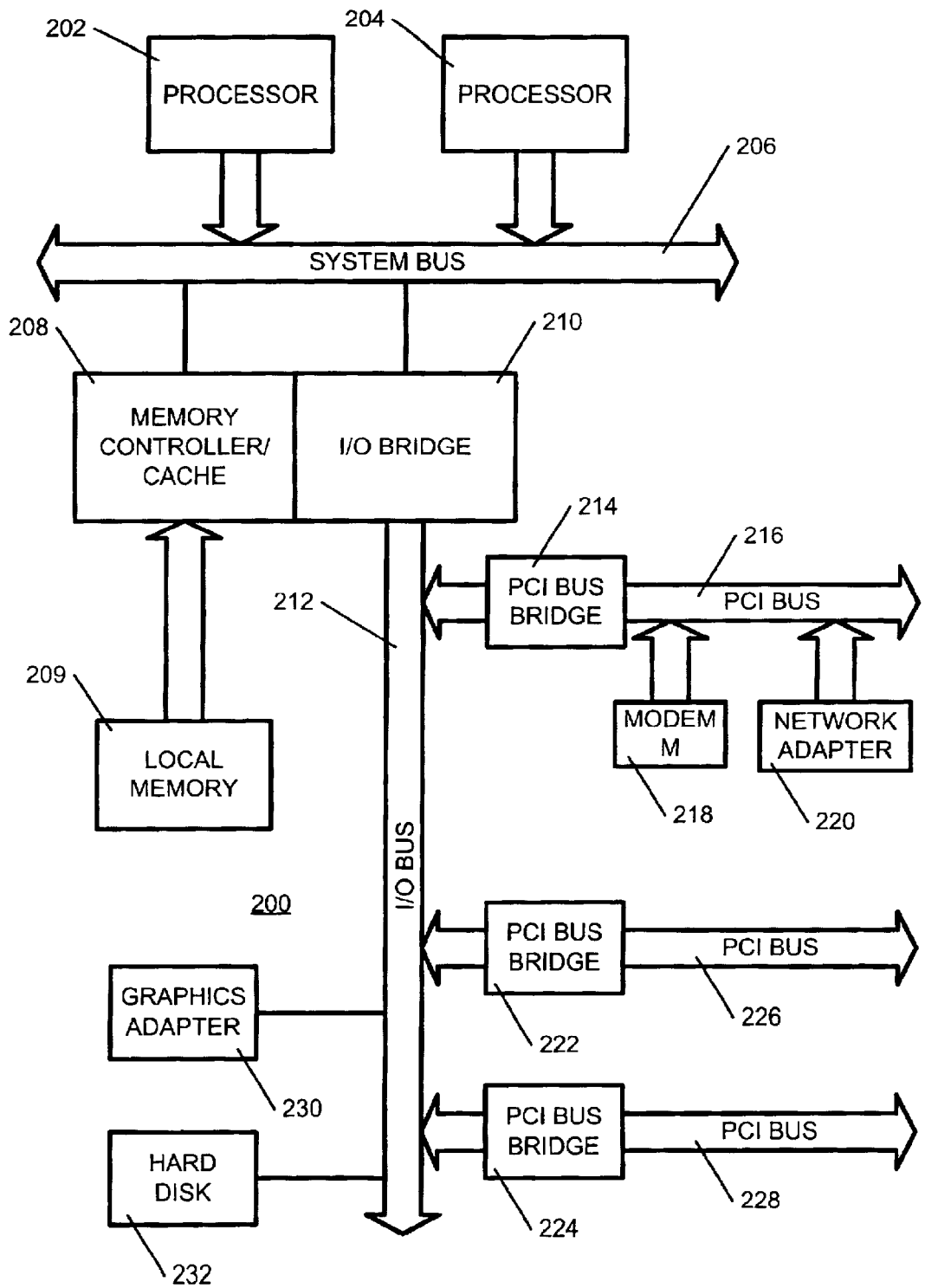
FIG. 2 is an exemplary block diagram of a server apparatus according to the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to network computers 108, 110 and 112 in FIG. 1 may be provided through modem 218 and network adapter 220 connected to PCI local bus 216 through add-in boards. Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM e-Server pSeries system, a product of International Business Machines Corporation in Armonk, New York, running the Advanced Interactive Executive (AIX) operating system or LINUX operating system.

Figure 3:
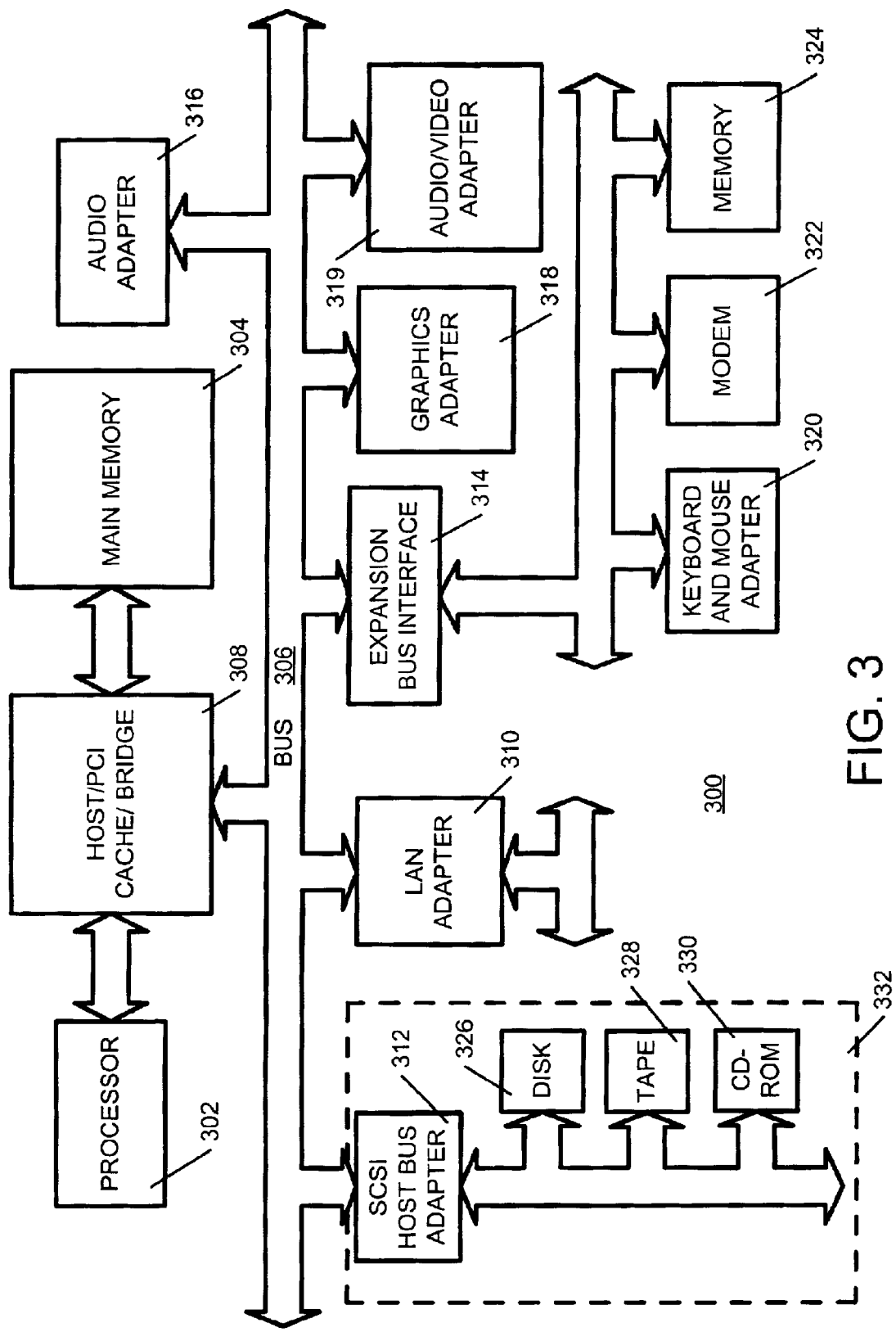
FIG. 3 is an exemplary block diagram of a client apparatus according to the present invention.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 may also be a notebook computer or hand held computer in addition to taking the form of a PDA. Data processing system 300 also may be a kiosk or a Web appliance.

The present invention provides an apparatus and method that allow a Web page including a string of previously displayed Web pages from which the Web page emanates to be bookmarked all at once. The invention may be local to client systems 108, 110 and 112 of FIG. 1 or to the server 104 or to both the server 104 and clients 108, 110 and 112. Consequently, the present invention may reside on any data storage medium (i.e., floppy disk, compact disk, hard disk, ROM, RAM, etc.) used by a computer system.

Figure 4:
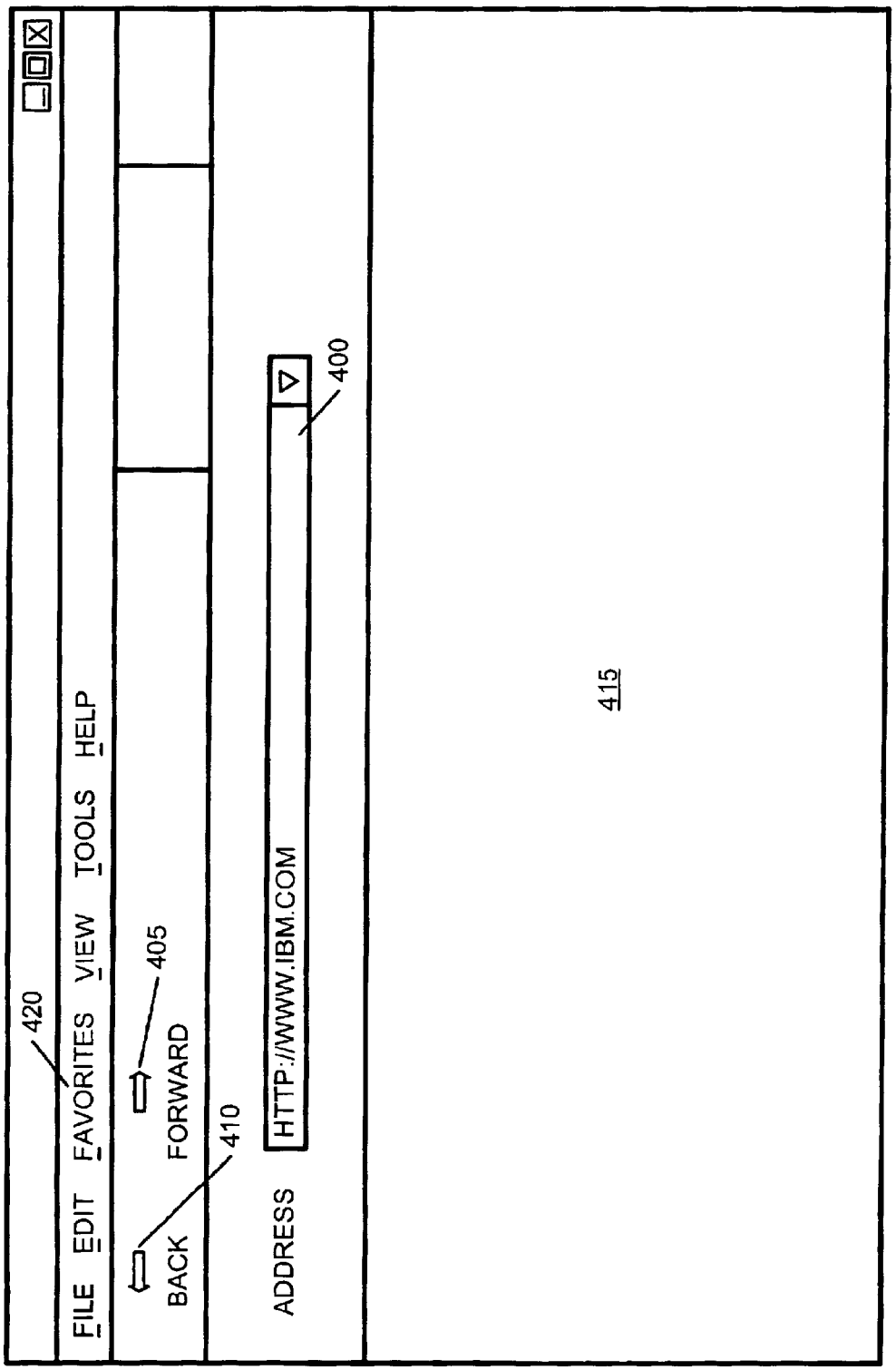
FIG. 4 is a representative graphical user interface (GUI) of a Web browser.

FIG. 4 is a representative graphical user interface (GUI) of a Web browser. Not all items in the GUI are shown and only the items of importance to the invention are given a reference numeral. When a Web browser is activated and a Web page is accessed, the content of the page is displayed in area 415, the address or URL of the page is displayed in address box 400. Back arrow 410 and forward arrow 405 are not live (i.e., a user cannot assert them to get to a Web page). If another Web page is accessed, the URL of the displayed page will be displayed in address box 400 and the content in area 415. The back arrow 410 will become live. If the user asserts back arrow 410, the previous page will be re-displayed along will its pertinent information (i.e., URL, content etc.). At that time, forward arrow 405 will become live, back arrow 410 will not be live. If a user accesses three different Web pages successively, and while the third page is displayed returns to the second page using the back arrow 410, both back arrow 410 and forward arrow 405 will be live. The user may assert back arrow 410 to re-display the first Web page or forward arrow 405 to re-display the third Web page. This is made possible by caching or storing the URLs in a memory device (not shown) in the order the Web pages were accessed. Note that, if a new Web page is accessed while the second Web page is displayed, the URL of the new page will be cached replacing the URL of the third page. Caching URLs of Web pages is a well-known art and is thus not explained.

To better understand the invention, an example will be provided. Suppose some Web sites have been compromised by a specific method and suppose through links embedded in a succession of Web pages, the user arrives at a Web site that explains how to ensure against that method. The user may want to bookmark that Web page. Suppose further, that the previously accessed Web pages each contained relevant information regarding Internet security. At the time of bookmarking the Web page, the user may decide that the previously accessed Web pages are worth being re-visited.

As mentioned before, presently when a user is faced with this circumstance, the user has to re-access all the previously displayed pages in order to bookmark them. The user may use the back and forward arrows 410 and 415 to accomplish this task. Obviously, time will be spent to re-access and bookmark the pages. The invention uses an additional option that can be used to bookmark all previously accessed Web pages while bookmarking a presently displayed Web page to save the user the time needed to re-access and bookmark the pages.

To bookmark a page, the bookmark folder has to be opened. In Netscape Navigator, a user has to click once on a "Bookmark" icon and in Internet Explorer the user has to click once on a "Favorites" icon to open the bookmark folder. In this particular example, Internet Explorer is used. However, it should be understood that any Web browser having a bookmark feature may be used with the invention.

Figure 5:
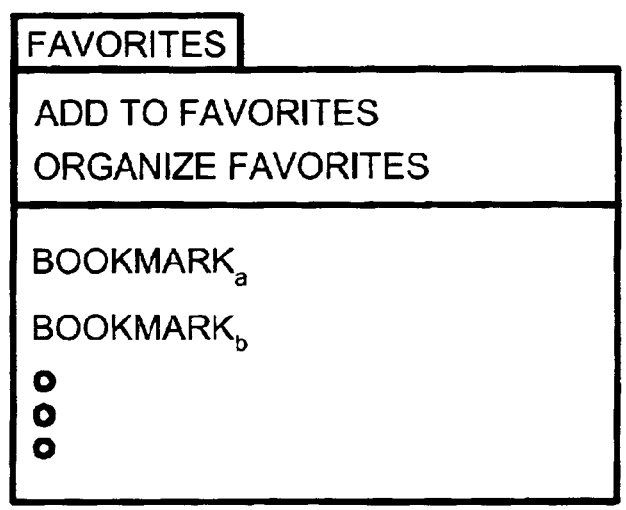
FIG. 5 is a typical bookmark folder.
Figure 6:
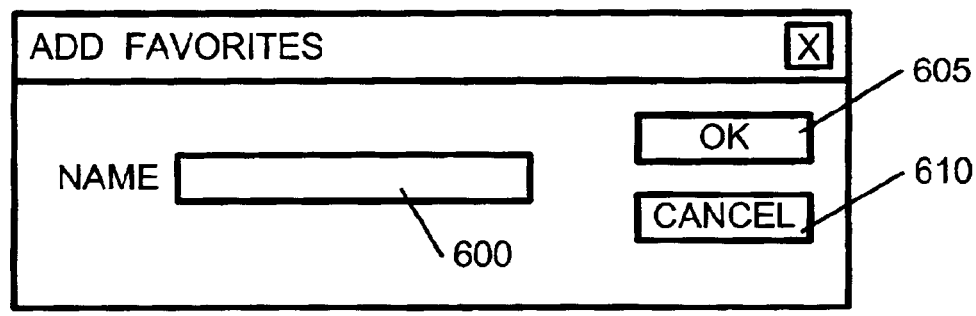
FIG. 6 depicts a GUI for bookmarking a Web page.

Returning to FIG. 4, when the menu in Favorites item 420 is pulled down, the GUI in FIG. 5 is displayed. When a user asserts "add to Favorites", FIG. 6 is displayed. In name box 600 is displayed a default name associated with the URL. If the user so wants, the user may replace the default name by another name of the user's liking. When done, ok button 605 can be asserted to bookmark the page, or cancel button 610 can be asserted to close the FIG. 6 without bookmarking the page.

Figure 7:
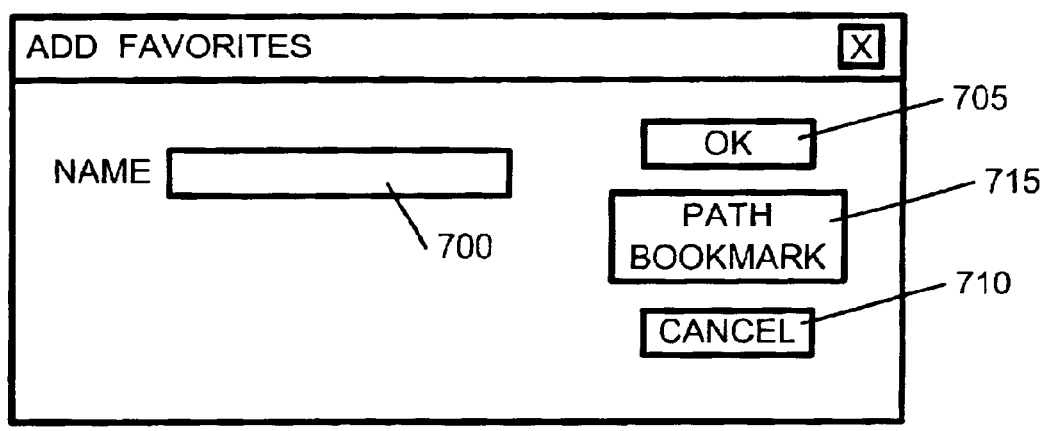
FIG. 7 depicts a GUI for bookmarking a Web page used by the present invention.
Figure 8:
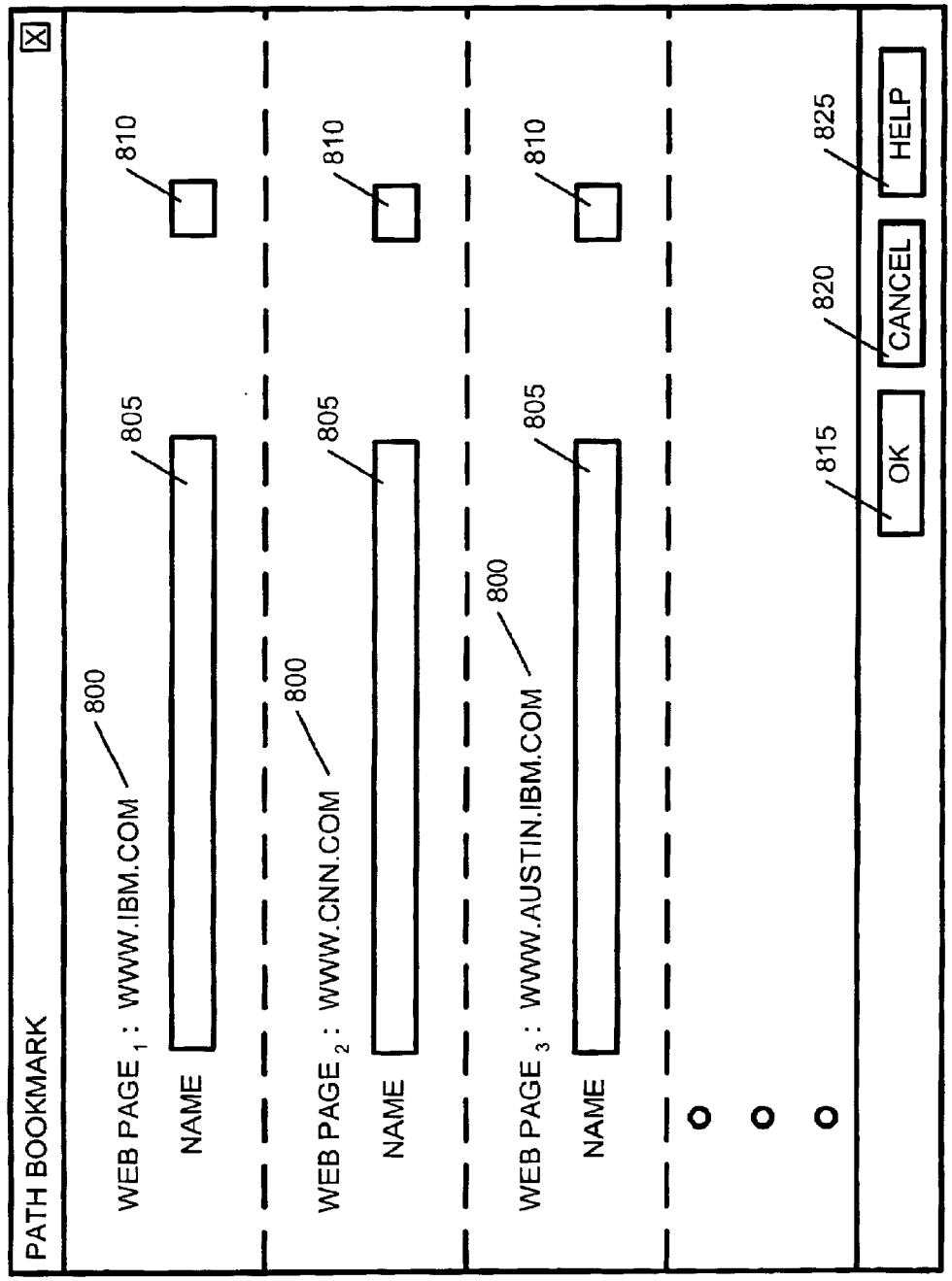
FIG. 8 depicts a GUI used by the present invention to select which of a plurality of Web pages to bookmark.

FIG. 7 is a depiction of FIG. 6 with an added button. The added button is path bookmark button 715. Name box 700, ok button 705 and cancel button 710 have the same purpose as name box 600, ok button 605 and cancel button 610 in FIG. 6. When the user asserts path bookmark button 715, another GUI is displayed with a list of previously accessed web pages. FIG. 8 is a GUI used by the present invention with such list.

In FIG. 8, the URLs $800_N$ of all the previously accessed Web pages are displayed and their default names are shown in name box $805_N$. Next to each name box is a box $810_N$. This box has to be checked if the Web page is to be bookmarked in conjunction with the presently displayed Web page. Note that here N is an integer that goes from one (1) to the number of Web pages visited to arrive at the page to be bookmarked (i.e., 1<=N<=number of Web pages visited to arrive at the page to be bookmarked).

Again, the user may change the default names to preferred names, if desired, by entering the preferred names in box name $805_N$ and deleting the default ones. When done, the user may assert ok button 815 to return to the GUI of FIG. 7. In this case, when the user asserts ok button 705 of FIG. 7, all the Web pages displayed in FIG. 8 with a check mark in boxes $810_N$ will be bookmarked in conjunction with the presently displayed Web page.

If the user asserts cancel button 820, the user will return to FIG. 7 and when the ok button 705 is asserted, only the presently displayed Web page will be bookmarked. As customary, the user may assert help button 825 to find out how to use the present invention.

The URLs $800_N$ are retrieved from the cache memory. If the default names of the Web pages are not also cached, the present invention may use the cached URLs to access the Web pages and retrieve the default names. These transactions will be accomplished in the background (i.e., will be transparent to the user).

Figure 9:
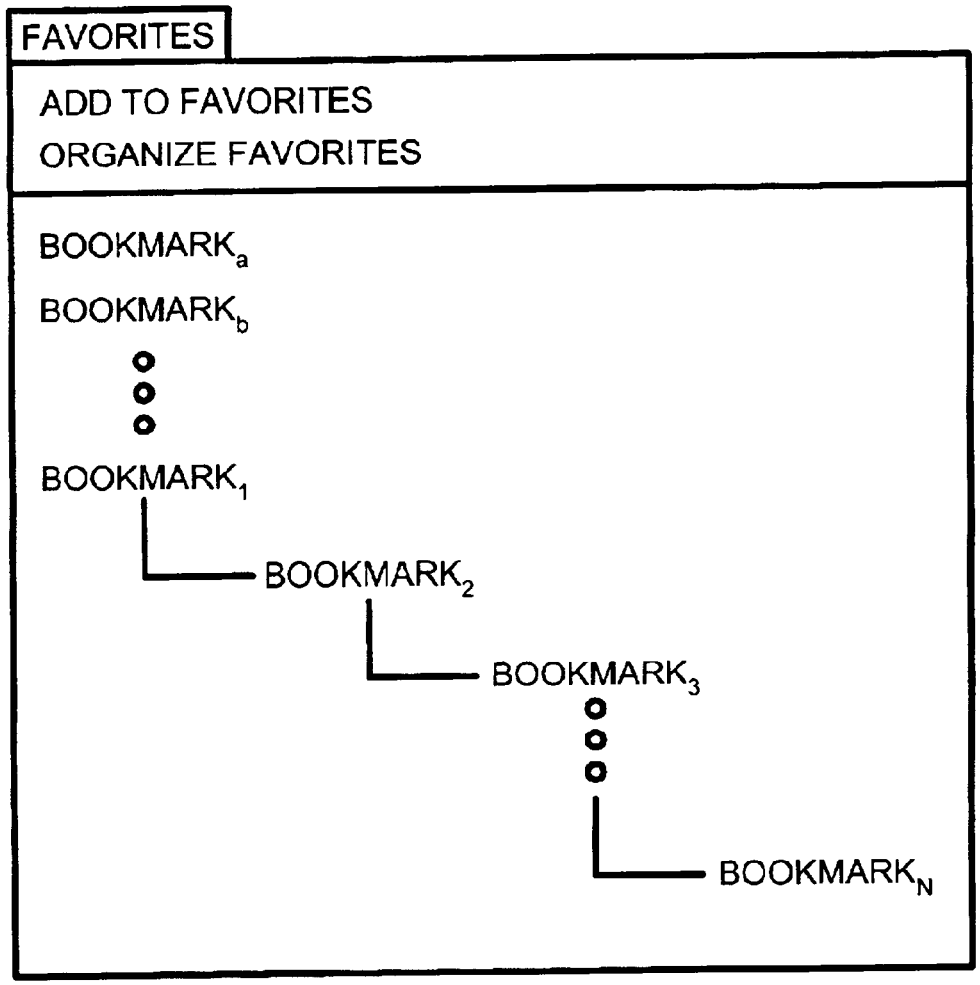
FIG. 9 depicts a bookmark folder used by the present invention.

When the user accesses the bookmark folder (i.e., the "Favorites" pull down menu) anytime thereafter, FIG. 9 will be displayed. Bookmark$_a$, bookmark$_b$ etc. are the usual bookmarks. That is, the names of the Web pages, which in this case are represented by bookmark$_a$, bookmark$_b$ etc., are displayed and the user may access any one of the Web pages by just double clicking (with the mouse) on a corresponding name. The chain of bookmarks (i.e., bookmark$_1$, bookmark$_2$, bookmark$_3$ . . . bookmark$_N$) is how a path bookmark is represented. Bookmark$_1$, is the name of the first Web page to be accessed and displayed, bookmark$_2$ is the name of the second one and so on and bookmark$_N$ is the name of the last page (i.e., the page that was displayed when the user decided to bookmark the path). Consequently, just looking at the chain of bookmarks, one can determine in what order the pages were accessed and displayed. To access any one of the pages, a user needs only double click on the name of that respective Web page, just as before. If when bookmarking the path, the user had decided not to bookmark one of the pages (i.e., by not putting a check mark in a corresponding box 810), then the name of the Web page will not be displayed or will be displayed but will not be live in order to retain the order in which the pages were accessed and displayed.

Figure 10:
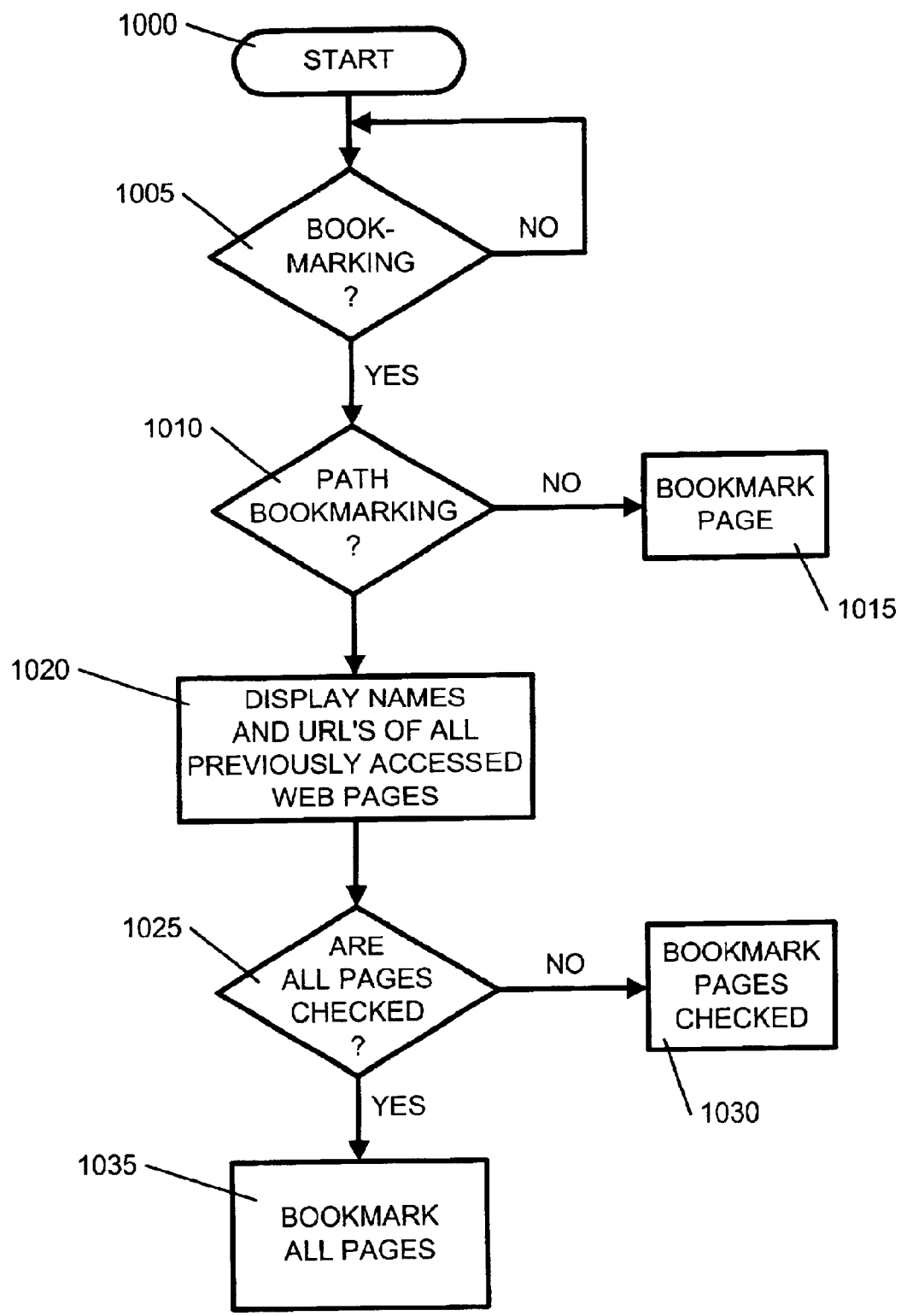
FIG. 10 is flow diagram of a process used by the present invention.

FIG. 10 is a flow diagram of a process used by the present invention. The process starts as soon as the bookmark folder is accessed (step 1000). A check will continuously be made as to whether a Web page is to be bookmarked. If so, a check is made as to whether a path is to be bookmarked. If not, then the displayed page is bookmarked if the user so desires (steps 10005, 1010 and 1015). If a path is to be bookmarked, then the names and URLs of the previously accessed Web pages are displayed for the user to select which, if not all, of the different Web pages are to be bookmarked in conjunction with the presently displayed page (step 1020). When the user asserts the ok button 705 of FIG. 7, all the checked Web pages are bookmarked (steps 1025, 1030 and 1035).

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of bookmarking a path to a presently displayed web page, said path including a Uniform Resource Locator (URL) of one Web page or URLs of a plurality of Web pages accessed in succession and through which the presently displayed Web page emanates, said method comprising the steps of:
   prompting a user, upon an indication that the presently displayed Web page is to be bookmarked, to indicate whether the path is to be bookmarked; and
   bookmarking the path if the user so indicates, otherwise bookmarking only the currently displayed Web page.

2. The method of claim 1 wherein the step of bookmarking the path includes the step of storing the URL of the one Web page or the URLs of the plurality of the Web pages in the order the Web pages were accessed in a bookmark folder.

3. The method of claim 2 wherein in indicating whether the path is to be bookmarked, the user may select one or more Web pages from the plurality of the Web pages accessed in succession to be bookmarked.

4. The method of claim 3 wherein the bookmarked Web pages are displayed as a chain of bookmarked Web pages in the order accessed.

5. The method of claim 4 wherein Web pages that are not selected to be bookmarked by the user are included in the chain but may not be accessed through their stored URLs.

6. The method of claim 4 wherein Web pages that are not selected to be bookmarked by the user are not included in the chain.

7. A computer program product on a computer readable medium for bookmarking a path to a presently displayed Web page, said path including a Uniform Resource Locator (URL) of one Web page or URLs of a plurality of Web pages accessed in succession and through which the presently displayed Web page emanates, said computer program product comprising:
   code means for prompting a user, upon an indication that the presently displayed Web page is to be bookmarked, to indicate whether the path is to be bookmarked; and
   code means for bookmarking the path if the user so indicates, otherwise bookmarking only the displayed Web page.

8. The computer program product of claim 7 wherein the bookmarking code means includes code means for storing the URL of the one Web page or the URLs of the plurality of the Web pages in the order the Web pages were accessed in a bookmark folder.

9. The computer program product of claim 8 wherein in indicating whether the path is to be bookmarked, the user may select one or more Web pages from the plurality of the Web pages accessed in succession to be bookmarked.

10. The computer program product of claim 9 wherein the bookmarked Web pages are displayed as a chain of bookmarked Web pages in the order accessed.

11. The computer program product of claim 10 wherein Web pages that are not selected to be bookmarked by the user are included in the chain but may not be accessed through their stored URLs.

12. The computer program product of claim 10 wherein Web pages that are not selected to be bookmarked by the user are not included in the chain.

13. An apparatus for bookmarking a path to a presently displayed Web page, said path including a Uniform Resource Locator (URL) of one Web page or URLs of a plurality of Web pages accessed in succession and through which the presently displayed Web page emanates, said apparatus comprising:
   means for prompting a user, upon an indication that the presently displayed Web page is to be bookmarked, to indicate whether the path is to be bookmarked; and
   means for bookmarking the path if the user so indicates, otherwise bookmarking only the currently displayed Web page.

14. The apparatus of claim 13 wherein the bookmarking means includes means for storing the URL of the one Web page or the URLs of the plurality of the Web pages in the order the Web pages were accessed in a bookmark folder.

15. The apparatus of claim 14 wherein in indicating whether the path is to be bookmarked, the user may select one or more Web pages from the plurality of the Web pages accessed in succession to be bookmarked.

16. The apparatus of claim 15 wherein the bookmarked Web pages are displayed as a chain of bookmarked Web pages in the order accessed.

17. The apparatus of claim 16 wherein Web pages that are not selected to be bookmarked by the user are included in the chain but may not be accessed through their stored URLs.

18. The apparatus of claim 16 wherein Web pages that are not selected to be bookmarked by the user are not included in the chain.

19. A computer system on which a path to a presently displayed Web page is to be bookmarked, said path including a Uniform Resource Locator (URL) of one Web page or URLs of a plurality of Web pages accessed in succession and through which the presently displayed Web page emanates, said computer system comprising:
   a storage device for storing code data; and
   a processor for processing said code data to prompt a user, upon an indication that the presently displayed Web page is to be bookmarked, to indicate whether the path is to be bookmarked; and to bookmark the path if the user so indicates, otherwise to bookmark only the currently displayed Web page.

20. The computer system of claim 19 wherein the code data is further processed to store the URL of the one Web page or the URLs of the plurality of the Web pages in the order the Web pages were accessed in a bookmark folder in bookmarking the Web pages.

21. The computer system of claim 20 wherein in indicating whether the path is to be bookmarked, the user may select one or more Web pages from the plurality of the Web pages accessed in succession to be bookmarked.

22. The computer system of claim 21 wherein the bookmarked Web pages are displayed as a chain of bookmarked Web pages in the order accessed.

23. The computer system of claim 22 wherein Web pages that are not selected to be bookmarked by the user are included in the chain but may not be accessed through their stored URLs.

24. The computer system of claim 22 wherein Web pages that are not selected to be bookmarked by the user are not included in the chain.

25. A method of bookmarking a path to a web page comprising the steps of:
   successively accessing a plurality of Web pages;
   bookmarking, all at once, more than one but less than all of the plurality of the accessed Web pages; and
   displaying in a bookmark folder, the plurality of the Web pages, in the order accessed, as a chain of Web pages wherein the bookmarked Web pages are accessible via a hyperlink in the displayed chain of Web pages and Web pages that are not bookmarked are not accessible via a hyperlink in the displayed chain of Web pages.

26. A computer program product on a computer readable medium for bookmarking a path to a web page comprising:

code means for successively accessing a plurality of Web pages;

code means for bookmarking, all at once, more than one but less than all of the plurality of the accessed Web pages; and code means for displaying in a bookmark folder, the plurality of the Web pages, in the order accessed, as a chain of Web pages wherein the bookmarked Web pages are accessible via a hyperlink in the displayed chain of Web pages and Web pages that are not bookmarked are not accessible via a hyperlink in the displayed chain of Web pages.

27. An apparatus for bookmarking a path to a web page comprising:

means for successively accessing a plurality of Web pages;

means for bookmarking, all at once, more than one but less than all of the plurality of the accessed Web pages; and means for displaying in a bookmark folder, the plurality of the Web pages, in the order accessed, as a chain of Web pages wherein the bookmarked Web pages are accessible via a hyperlink in the displayed chain of Web pages and Web pages that are not bookmarked are not accessible via a hyperlink in the displayed chain of Web pages.

28. A computer system on which a path to a web page is to be bookmarked comprising:

at least one storage device for storing code data; and at least one processor for processing the code data to successively access a plurality of Web pages, to bookmark, all at once, more than one but less than all of the plurality of the accessed Web pages, to display in a bookmark folder, the plurality of the Web pages, in the order accessed, as a chain of Web pages wherein the bookmarked Web pages are accessible via a hyperlink in the displayed chain of Web pages and Web pages that are not bookmarked are not accessible via a hyperlink in the displayed chain of Web pages.

* * * * *